United States Patent [19]

Mesey

[11] 4,143,637

[45] Mar. 13, 1979

[54] DRESSING DEVICE FOR PLATE-SHAPED GRINDING WHEELS OF A GEAR TOOTH FLANK-GRINDING MACHINE

[75] Inventor: Milton M. Mesey, Wallisellen, Switzerland

[73] Assignee: Maag Gear-Wheel & Machine Co. Ltd., Zurich, Switzerland

[21] Appl. No.: 830,877

[22] Filed: Sep. 6, 1977

[30] Foreign Application Priority Data

Oct. 5, 1976 [DE] Fed. Rep. of Germany ....... 2644890

[51] Int. Cl.² ............................................. B24B 53/04
[52] U.S. Cl. ............................ 125/11 CC; 51/165.87; 125/11 CD
[58] Field of Search ............ 125/11 R, 11 CC, 11 TP, 125/11 CD; 51/165.87, 165.88

[56] References Cited

U.S. PATENT DOCUMENTS 957,689   5/1910   King .............................. 125/11 CD
1,715,122   5/1929   DeUlieg ......................... 125/11 TP

FOREIGN PATENT DOCUMENTS 700800   12/1952   United Kingdom ................ 125/11 TP

*Primary Examiner*—Harold D. Whitehead
*Attorney, Agent, or Firm*—Werner W. Kleeman

[57] ABSTRACT

A dressing device for a substantially plate-shaped grinding wheel at a tooth flank-grinding machine for a gear comprising a dressing tool which is radially feedable by a drive means for dressing the outer or jacket surface of the grinding wheel. Measuring means serve to measure the axial feed movement of the or dished grinding wheel and the radial feed movement of the dressing tool. Control means serve to control the drive means for the radial feed movement in such a manner that its relationship to the axial feed movement of the grinding wheel corresponds to the tangent of the angle of inclination of the rear surface of the grinding wheel with respect to its lengthwise axis.

4 Claims, 2 Drawing Figures

DRESSING DEVICE FOR PLATE-SHAPED GRINDING WHEELS OF A GEAR TOOTH FLANK-GRINDING MACHINE

BACKGROUND OF THE INVENTION

The present invention relates to a new and improved construction of dressing device for substantially plate-shaped grinding wheels of a tooth flank-grinding machine for gears.

Plate-shaped grinding wheels or disks gradually become thinner due to the uniform dressing of their end surfaces. If the width of the outer or jacket surface i.e. the active rim of the grinding wheel were permitted to appreciably decrease, then the danger would exist that the grinding wheel would tend to crumble at its outer edge. Therefore, it is necessary that the grinding wheel be periodically dressed also at its outer or jacket surface in order that the original width of such outer surface is at least approximately again reestablished. With state-of-the-art dressing devices, this is accomplished in accordance with the judgement of the operator, and as a result there can be produced either a too wide or too narrow outer or jacket surface. When the outer surface of the grinding wheel is too wide there is present the danger that the grinding wheel, during grinding a tooth flank, wipingly contacts a counter-flank with its truncated conical-shaped rear surface. On the other hand, if the grinding wheel has an outer surface which is too narrow then there exists the aforementioned danger of crumbling away of the edge thereof.

SUMMARY OF THE INVENTION

Hence, with the foregoing in mind it is a primary object of the present invention to provide a new and improved construction of dressing device for plate-like or dished grinding wheels of a gear tooth-flank grinding machine which is not associated with the aforementioned drawbacks and limitations of the prior art proposals.

Another and more specific object of the present invention aims at the provision of a new and improved construction of a dressing device which, without requiring any particularly great attention of the user, enables maintaining a once established width of the outer or jacket surface of the grinding wheel.

Yet a further significant object of the present invention aims at the provision of a new and improved construction of dressing device for a substantially plate-shaped or dished grinding wheel of a tooth-flank grinding machine for gears, which is relatively simple in construction and design, economical to manufacture, relatively easy to use, requires a minimum of maintenance and servicing, not readily prone to breakdown or malfunction, and enables maintaining a desired set width of the outer surface of the grinding wheel.

Now in order to implement these and still further objects of the invention, the dressing device for plate-shaped grinding wheels of a tooth-flank grinding machine for gears is generally of the type comprising a first dressing tool which, during axial feed of the grinding wheel dresses its end surface, and a second dressing tool which is radially advanceable or feedable for dressing the outer or jacket surface of the grinding wheel. According to important aspects of the present invention, it is contemplated to provide measuring means which measure the axial feed movement of the grinding wheel and the radial feed movement of the radially feedable second dressing tool. There is also provided a control means which controls drive means for the radial feed movement in such a manner that its relationship to the axial feed movement corresponds to the tangent of the angle of inclination of the rear surface of the grinding wheel with respect to its lengthwise axis. This solution can be realized without any great difficulty with conventional mechanical, electrical, electronic, hydraulic or pneumatic means.

A control means suitable for use with the present invention is shown and described in Sigma Instruments, Inc., Das Schrittmotoren-Handbuch (The Stepping Motor Handbook), published by Sigma Instruments, Inc., D-8170 Bad Tölz, Burgsteinstrasse 14, Germany in 1973 at page 90, FIG. 70a.

The inventive tangent control is adequate, without having to resort to the use of any additional means, if the possibility is left to the operator, in each case at the start of using a grinding wheel, prior to the initial dressing of the end surface by the first dressing tool, to adjust the second, radially feedable dressing tool in such a manner that it ensures for the desired width of the outer surface of the grinding wheel. The inventive dressing device is even still easier to use if, according to a further feature of the invention, there is stored in the measuring means or in the control means a settable constant value corresponding to the desired width of the outer surface and by the amount of which constant value, starting from a common starting point where a generatrix or jacket line of the rear surface of the grinding wheel intersects its end surface, the radial feed movement leads the axial feed movement.

In the case of a tooth-flank grinding machine having a grinding spindle bearing which participates in the axial feed movement of the grinding wheel, and a radial carriage which supports the second dressing tool, it is suitable in accordance with, for instance, a preferred mechanical construction of the previously described solution, if the measuring means comprises a template which is connected with the grinding spindle support or bearing and possesses an inclined surface essentially parallel to a generatrix of the rear surface of the grinding wheel. Additionally, there is provided a feeler or sensing lever which is mounted at the radial carriage, this feeler lever being held in contact with the inclined surface of the template and functions as an actuation element for a switch provided as the control means. This switch can be an electrical switch for an electrical feed motor, but it also can be a valve for a hydraulic or pneumatic feed device.

If it is desired to store the above-discussed adjustable or settable constant value by means of a template, as in the previously described embodiment, then this can be accomplished if such template is positionally adjusted with regard to the grinding spindle bearing, substantially parallel to the axis of the grinding wheel.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
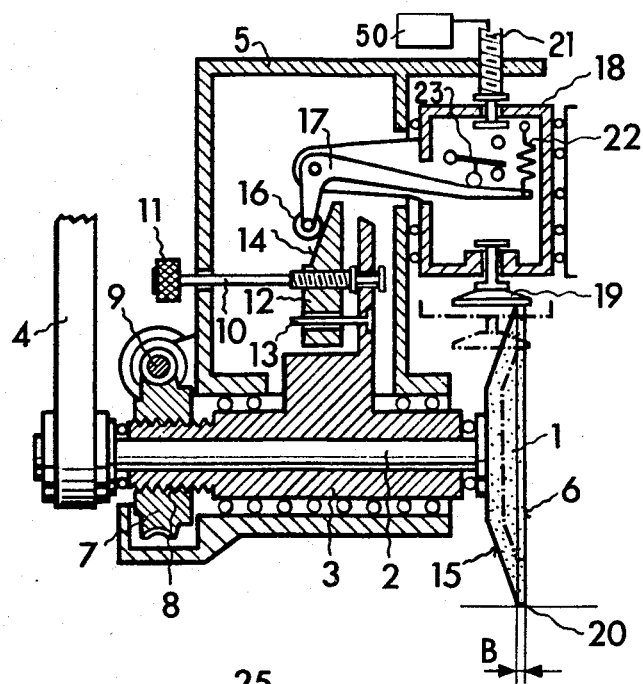
FIG. 1 illustrates a first exemplary embodiment, in axial sectional view through a grinding headstock, which embodiment is predominantly mechanical in nature.

Describing now the drawings, it is to be understood that both exemplary embodiments relate to a dressing device for a gear grinding machine wherein a substantially dished or plate-shaped grinding wheel or disk 1 is secured to a grinding spindle 2 mounted in a grinding support or bearing 3 and driven by a belt 4 or equivalent structure. The grinding spindle bearing 3 is mounted to be axially displaceable in a grinding support 5 for the purpose of adjusting the end surface 6 of the grinding wheel 1. A worm gear 7 is provided for the axial displacement, this worm gear 7 being operatively connected by means of threading 8 with the grinding spindle bearing 3 and being driveable through the agency of a worm 9. Due to the axial displacement towards the right of the showing of the drawings the end surface 6 of the grinding wheel 1 can be brought into engagement with a first not particularly illustrated standard dressing tool which is arranged to be axially nondisplaceable and serving to dress such end surface 6 of the grinding wheel 1 in a conventional manner. Since the invention is not particularly concerned with dressing the end surface 6 of the grinding wheel 1 further details of the first dressing tool are not here necessary.

With the exemplary embodiment of FIG. 1 a threaded spindle 10 is mounted upon the grinding spindle bearing 3 so as to be essentially axially parallel with regard to grinding spindle 2. This threaded spindle 10 is rotatable by means of an adjustment knob 11 and carries a template 12 which is secured against rotation by a likewise axially parallel extending rod 13. The template 12 has an inclined surface 14 possessing the same inclination as the truncated conical-shaped rear surface 15 of the grinding wheel or disk 1. A feeler roller or roll 16 travels upon the inclined surface 14, this feeler roller 16 being mounted at a feeler lever 17 of angled or bent construction in the illustrated embodiment. This feeler lever 17 is mounted in a radial carriage 18 which is movably guided perpendicular to the axis of the grinding spindle 2 in the grinding support 5 and supports a second dressing tool 19 for dressing the cylindrical jacket or outer surface i.e. the active rim 20 of the grinding wheel 1. The dressing tool 19, in the illustrated embodiment, is in the form of a plate which is rotatably mounted at the radial carriage 18. In order to feed the radial carriage 18 there is provided a threaded spindle 21 which can be driven by any suitable and therefore merely schematically illustrated drive motor 50. The feeler roll or roller 16 is biased by means of a tension spring 22, suspended at the feeler lever 17, against the template 12. This feeler lever 17 constitutes the actuation element for an electrical switch 23 which, by means of the threaded spindle 21, controls the feed movement of the radial carriage 18.

To the degree with which the end face or surface 6 of the grinding wheel or disk 1 wears during grinding of the teeth flanks of a tooth, such grinding wheel is shifted towards the right by means of the worm 9, the worm gear 7 and the threading 8, so that the width B of the outer or jacket surface 20 gradually decreases. However, the template 12 and the feeler roller 16 also follows such displacement or shifting of the grinding wheel 1 and the grinding spindle bearing 3. Consequently, the switch 23 is actuated by the feeler lever 17, so that it closes the current circuit of the drive motor 50 of the threaded spindle 21. The threaded spindle 21 which thus is placed into rotation, downwardly displaces the radial carriage 18. During this feed movement the cylindrical jacket or outer surface 20 of the grinding wheel 1 is dressed until there is again obtained the preselected width B. Then, the switch 23 returns back into the illustrated starting position and turns-off the drive motor 50 of the threaded spindle 21.

Now in FIG. 1 there is shown by means of the chain-dot lines the dressing tool 19 in a position which it assumes when the described operation has repeated a number of times with increasing wear of the grinding wheel 1.

In the event that there should be selected a greater width B for grinding teeth of larger modulus, then by means of the adjustment or setting knob 11 the threaded spindle 10 is turned and thus the template 12 is displaced towards the right with respect to the grinding spindle bearing 3. The dressing tool 19 is then again placed into operation for the dressing of the cylindrical jacket or outer surface 20, until there has been reached the preselected larger width B.

Figure 2:
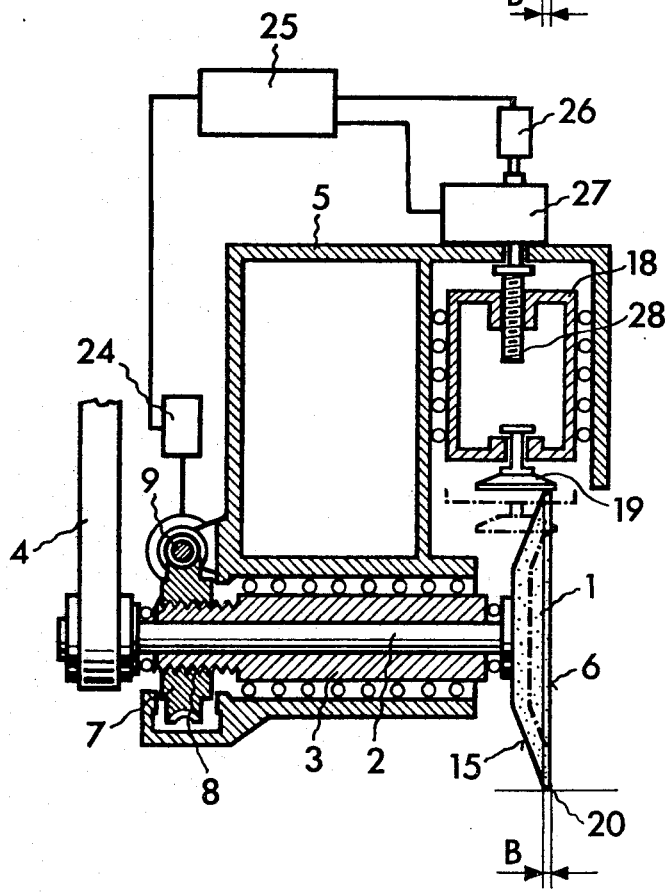
FIG. 2 is an axial sectional view through a grinding headstock of a second exemplary embodiment which is predominantly electrical-electronical in nature.

With the exemplary embodiment illustrated in FIG. 2 there is operatively connected with the worm 9 a measuring means or device 24 which measures the setting of the worm 9 and thus also the axial shifting or deplacement of the grinding spindle bearing 3 together with the grinding wheel 1. Electrically connected with the measuring means or device 24 is a control means or device 25 and a further measuring means or device 26. The various elements or means of the control system of FIG. 2 may comprise the system shown, for example, in FIG. 70a of Sigma Instruments, Inc., Das Schrittmotoren-Handbuch, mentioned above, at page 90. In the system shown in FIG. 70a, the measuring means 24 may be constituted by the taktgenerator (clock generator), the further measuring means or device 26 by the positionsgeber (position indicator), the drive 27 by the schrittmotor (stepping motor) and the control means or device 25 by the combination of the vorwahlzahler (pre-select counter), the ansteuerung (trigger control) and the kontroll-und korrekturlogik (control and correction logic). The radial carriage 18 is displaced by means of a drive 27 which, in turn, is electrically connected with the control device 25 and mechanically with a threaded spindle 28.

Stored in the control device 25 is the inclination of the truncated cone-shaped rear surface 15 of the grinding wheel 1 and the selected width B of the outer surface or active rim 20 of such grinding wheel 1. If the grinding wheel is axially shifted due to rotation of the worm 9, then the control device 25 in response to a signal delivered by the measuring device 24 ensures that the drive 27 rotates the threaded spindle 28 and thus brings about a feed movement of the radial carriage 18. As a result, the dressing tool 19 dresses the cylindrical outer surface 20. The measuring device 26 measures the feed movement and the control device 25 stops the drive or drive means 27 upon reaching the preselected width B.

While there are shown and described present preferred embodiments of the invention, it is to be distinctly understood that the invention is not limited thereto, but may be otherwise variously embodied and practiced within the scope of the following claims.

Accordingly, what I claim is:

1. A dressing device for dressing an outer peripheral surface of a substantially dished grinding wheel, said outer peripheral surface having a width and lying between an end grinding surface and a rear surface, at least part of said rear surface being inclined and serving for a tooth flank-grinding machine, comprising:

a dressing tool for said outer peripheral surface;

drive means for radially feeding said dressing tool for dressing the outer surface of the grinding wheel;

means for axially feeding said grinding wheel such that said end grinding surface lies essentially in a predetermined plane;

measuring means for measuring the axial feed movement of the grinding wheel and the radial feed movement of the dressing tool;

control means controlling the drive means for the radial feed movement in such a manner that the relationship thereof to the axial feed movement of the grinding wheel is equivalent to the tangent of the angle between the inclined part of said rear surface of the grinding wheel and its lengthwise axis for preventing the width of said outer surface of said grinding wheel from falling below a predetermined value as the end grinding face of said grinding wheel wears during the tooth flank-grinding operation.

2. The dressing device as defined in claim 1, wherein: at least any one of said measuring means and said control means has storable therein an adjustable constant value corresponding to the desired width of the outer surface of the grinding wheel; and wherein, starting from a common starting point at which a generatrix of the rear surface of the grinding wheel intersects an end surface thereof the radial feed movement leads the axial feed movement by an amount corresponding to said constant value.

3. The dressing device as defined in claim 1, wherein:

said axially feeding means comprises a grinding spindle bearing participating in the axial feed movement of the grinding wheel;

said drive means comprises radial carriage means for supporting and radially feeding the dressing tool;

said measuring means comprising a template connected with the grinding spindle bearing;

said template having an inclined surface which is essentially parallel to a generatrix of the gear surface of the grinding wheel;

a feeler lever carried by the radial carriage means;

means for placing the feeler lever into contact with the inclined surface;

said control means including a control device comprising a switch; and said feeler lever constituting an actuation element for said switch.

4. The dressing device as defined in claim 3, further including:

means for positionally adjusting the template with regard to the grinding spindle bearing in a direction substantially parallel to the lengthwise axis of the grinding wheel.

* * * * *